Aug. 29, 1944.    F. W. GOETZE    2,357,257
REINFORCED GASKET
Filed Dec. 28, 1942
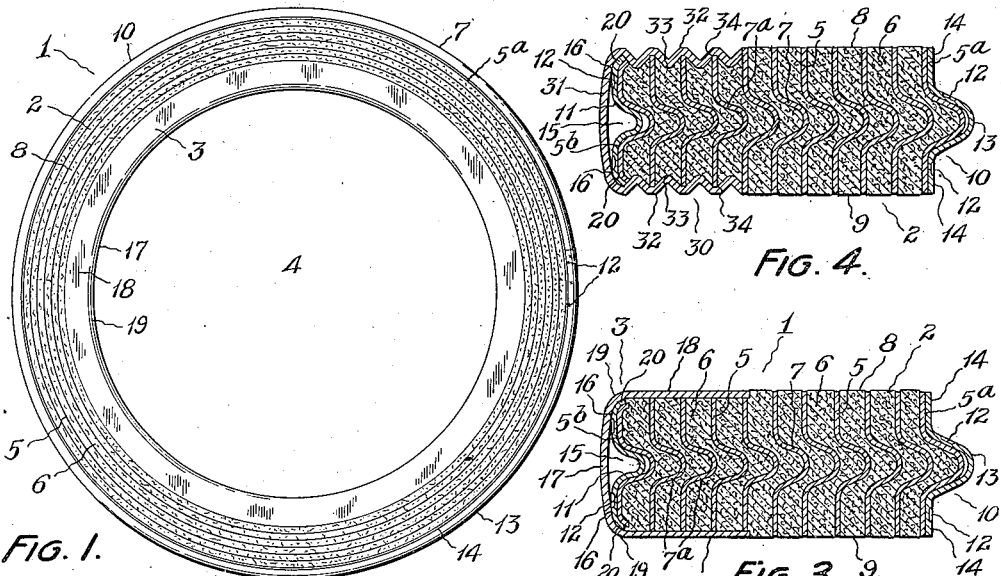
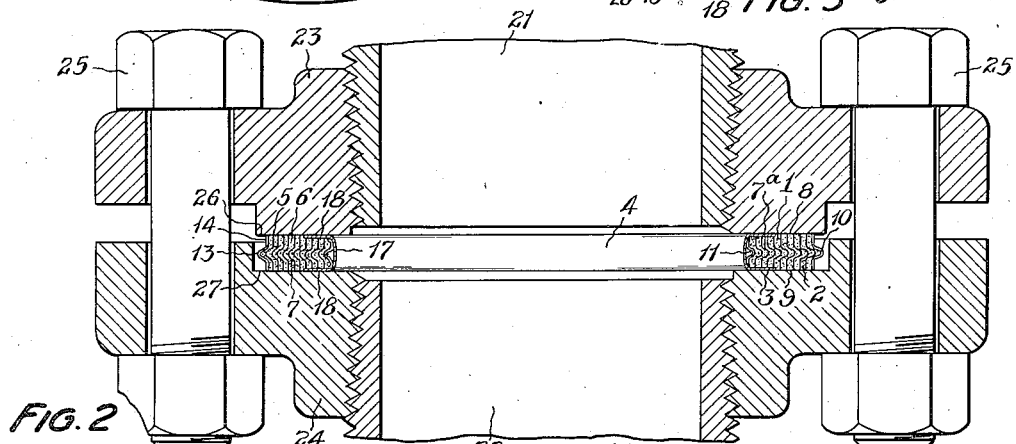
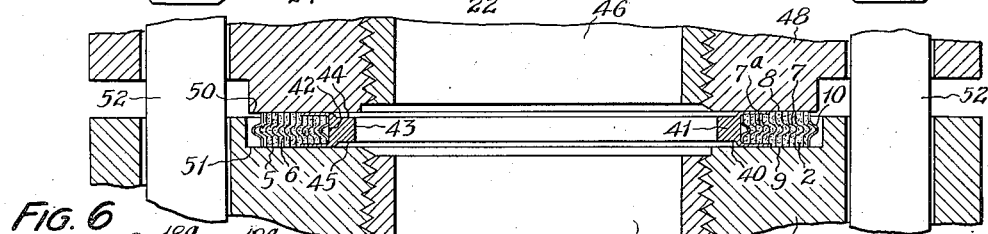
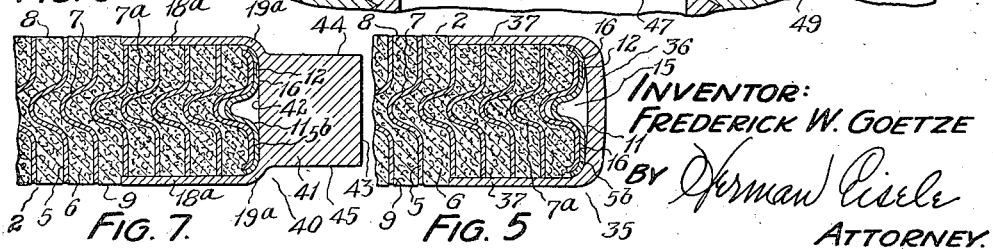
INVENTOR:
FREDERICK W. GOETZE
BY Norman Eisele
ATTORNEY.

Patented Aug. 29, 1944

2,357,257

UNITED STATES PATENT OFFICE 2,357,257

REINFORCED GASKET

Frederick W. Goetze, Franklin Park, N. J., Margie C. Goetze, executrix of said Frederick W. Goetze, deceased, assignor to Goetze Gasket & Packing Co., Inc., New Brunswick, N. J., a corporation of New Jersey Application December 28, 1942, Serial No. 470,331

6 Claims. (Cl. 288—26)

This invention relates generally to gaskets intended to be interposed between flanges or other plane surfaces in pressure piping or pressure vessels for the purpose of sealing the joint formed by these surfaces against leakage.

More specifically the invention relates to a type of gasket generally known as a spiralwound gasket which is especially well adapted for high pressures but which has very efficient sealing properties at normal pressures. This type of gasket is formed of spirally wound alternate metal and asbestos packing material strips. These metal strips are preformed with a central spring like corrugation or bead which is held under constant tension in service and imparts a measure of axial resilience to the gasket under the relatively high flange pressures, compensating for the expansion and contraction of joint flanges resulting from changes of pressure and temperatures. The central corrugations or beads serve the further purpose of axially interlocking the adjacent convolutions, thus preventing axial dishing of the gasket. In gaskets of this type at both the inner and outer peripheries, the metal strip is continued beyond the packing strip and is wound upon itself for several turns, these terminal convolutions or laminations being secured together in practice practically exclusively by spot welding.

While these spiralwound gaskets are normally very efficient and effective, under the severe conditions of pressure and temperature to which these gaskets are subjected in service, they have several weaknesses and limitations which seriously impair their efficiency and effectiveness as a gasket, and which make these gaskets far from 100% dependable under severe conditions.

A brief analysis of the most obvious of these weaknesses and their effects will be helpful to a better understanding of this invention.

The spot welding or tacking together of the terminal overlapping convolutions, which is made unavoidable by conditions of economy and convenience, is one of the greatest sources of weakness in this gasket. Due to the conformation and light gauge of the particular type of strip metal used in this gasket, it is difficult to produce perfect welds for securing the terminal convolutions to each other, for the reason that the electrodes must operate in substantially parallel positions instead of opposing each other as is usual in spot welding operations. In this spot welding of the strip metal, either severe burning and puncture of the strip on the one hand, or lack of satisfactory fusion of the metal on the other hand, is quite common, even with the most accurate current regulation and most careful supervision. As a result there is either a serious weakening of the strip metal due to a reduction in the cross section of metal or a lack of sufficient adherence between the metal layers. Failure of these welds frequently occurs either during the initial compression of the gasket or during subsequent fluctuation in gasket loading in service due to the distortion and weaving taking place in the convolutions tending to flex the peripheral strips or squeeze them apart. Such failure not only impairs and eventually destroys the effectiveness of the gasket but permits the unwinding of some of the convolutions with the possibility that a portion of the unwound convolution enters the pipe and is broken off and is carried thru the line.

Another weakness of this type of gasket is the wrinkling or inward collapsing and buckling of the inner convolutions of the strip metal under extreme pressures thus nullifying the advantageous sealing effect inherent in convolutions square with the faces of the flanges.

Another source of weakness in this type of gasket is the fact that spiralwound gaskets are relatively soft and easy to compress and hence subject to damage by distortion under excessive loading in high pressure service.

A further weakness of the spiralwound gasket is the seepage of sealed fluids such as steam and hot oils which are forced thru the small spiral channel formed between the metal and the asbestos, particularly along the bead into which, on some gaskets of this type, asbestos has not been forced, and also the seepage thru the asbestos itself acting as a wick, which occurs particularly with hot volatile oils and which actually draws the confined medium to the outside of the gasket.

A still further defect of this type of gasket is its inability to resist progressive corrosion and abrasion of the relatively thin strips of metal of the inner convolutions which corrosion most rapidly attacks the previously partly oxidized spot welds on these inner convolutions. This corrosion not only destroys the effectiveness of the sopt welds but also impairs the sealing effectiveness of the corroded section of this gasket. This corrosion and/or deterioration, having once started, progresses relatively rapidly outwardly along the sealing area of the gasket from convolution to convolution until the entire gasket fails.

In order therefor to overcome or correct the above defects and weaknesses of spiralwound gaskets, as heretofore known, it is a prime object of this invention to produce a gasket of this type in which the peripheral welds are reinforced and protected against failure in service and, in the event of such failure, to prevent the unwinding of the welded convolutions and to make provision for the continued satisfactory functioning of the gasket.

It is a further object of this invention to produce a gasket of the spiralwound type in which the peripheral convolutions of strip metal are supported against wrinkling or buckling away from the body of the gasket under extreme pressures.

It is a further object of this invention to produce a gasket of this type which is reinforced to provide the needed resistance to crushing under compressive forces which are in excess of those which the gasket is designed to normally resist.

It is a further object of this invention to produce a gasket of this type in which seepage of any kind thru the body of the gasket is entirely prevented.

It is a further object of this invention to produce a gasket of this type in which corrosion of the periphery of the gasket or peripheral convolutions of the metal strip is effectively retarded or entirely prevented.

It is an additional object of this invention to produce a gasket of this type in which the advance of the joint flanges toward each other will produce the greatest intensity of pressure in the inner zone of the gasket, adjacent the sealed opening, in order to bar the sealed fluid from access to any of the convolutions of strip metal in the zone removed from the sealed opening.

It is a further additional object of this invention to protect a relatively corrodible gasket of the spiralwound type against corrosion by the sealed fluid.

It is a further additional object of this invention to produce a gasket which presents two contiguous successive zones to the joint flange faces, each zone having a different type of metallic surface.

The above and other objects of this invention are obtained by the combinations and constructions constituting the present invention, preferred embodiments of which are shown in the accompanying drawing and are hereinafter described in detail, and claimed, and which may be briefly stated to include in one of its more specific forms: a gasket formed of alternate spirally wound convolutions of packing material and strip metal formed with a longitudinal median outwardly extending corrugation, the gasket having a periphery bounded by at least one overlapping convolution of strip metal and a protecting metallic sheath extending around the periphery and snugly engaging the periphery and formed with integral flange portions turned upon the annular zone of the top and bottom faces of the gasket adjacent the periphery and compressed into the top and bottom faces to a position flush with the exposed area of the gasket and to an extent to slightly axially compress the corrugated strip metal convolutions interposed between the flanges.

Further additional and more specific objects of this invention are disclosed in and described with reference to certain modified forms from which it will appear that it is a further and more specific object of this invention to produce a sheath for a gasket in which the sheath flanges engaging the faces of the gasket are formed with a plurality of spaced continuous ridges imbedded in faces of the spirally wound portion of the gasket.

It is also a further and more specific object to provide, for a gasket, a combined one piece sheath having a peripheral wall in which the back or web portion exposed to the sealed liquid is substantially thicker than the flange portion.

It is also a further and more specific object of this invention to provide a combined protective sheath and compression limiting gauge for a gasket.

Further and more specific objects of this invention will become apparent from the following description and claims:

Referring to the drawing:

Fig. 1 is a plan view of one form of this improved reinforced gasket disclosing a spirally wound component provided with a reinforcing and protecting sheath.

Fig. 2 is an axial section of a pipe joint sealed by a reinforced gasket of the type illustrated in Fig. 1, this gasket being interposed between flanges attached to adjacent ends of two alined pipes.

Fig. 3 is an enlarged transverse sectional view thru one side of the gasket illustrated in Fig. 1, showing the details of construction of the spiral wound gasket and the reinforcing sheath and the cooperative relation of these parts to each other.

Fig. 4 is a view similar to Fig. 3 illustrating, however, a modified form of sheath in which the sheath flanges are provided with spaced ridges imbedded in the faces of the spirally wound gasket.

Fig. 5 is a fragmentary view similar to a portion of Fig. 3 illustrating another modified form of reinforcing sheath.

Fig. 6 is a view similar to Fig. 2 illustrating, however, a gasket having still another modified form of reinforcing sheath which combines the functions of a protective sheath and a compression limiting gauge.

Fig. 7 is an enlarged transverse sectional view thru one side of the gasket illustrated in Fig. 6.

In the following specification and claims the term "axial" when used with reference to portions of the reinforced gasket is intended to indicate a direction parallel to or in the direction of a line passing thru the center of the gasket at right angles to the plane of the gasket, which line may be termed the axial center line of the gasket. Likewise, the term "radial" is intended to indicate a direction transverse to the axial center line of the gasket, that is, in a direction radial with respect to the center of the gasket. The terms "outwardly" or "inwardly" are intended to indicate directions respectively away from or toward the center of the gasket. The terms "top" or "upper" and "bottom" or "lower" are intended to indicate the top or bottom faces of the gasket as these appear in the sectional views of the drawing.

Referring first to the form of this invention illustrated in Figures 1 to 3 inclusive, this improved reinforced gasket is indicated in its entirety at 1 and consists of two components: a spirally wound component or gasket proper 2, and a protective sheath 3. The gasket is formed with an opening 4.

The component 2 is preferably formed of continuous spirally wound alternate strips of metal and packing material, the convolutions of metal being indicated at 5 and the convolutions of packing material at 6. The metal strip is formed intermediate its edges with a preferably centrally disposed spring line corrugation 7 forming an outwardly projecting bead positioned intermediate the two straight portions of the strip, substantially parallel to the axis of the gasket, as best appears in Fig. 3. The packing strip 6 extends at least to the top and bottom edges of the metal strip and is effectively interlocked in the internested corrugations 7 of the metal strip 5. The packing material is tightly compressed between the convolutions of metal strip and the whole forms a relatively strong but axially resilient sealing element. The packing strip preferably normally extends slightly beyond the top and bottom edges of the metal strip forming a top or upper surface or gasket face 8 and a bottom or lower surface or gasket face 9 which are particularly well adapted to effectively seal flanged surfaces even when the surface condition of the flanges is imperfect.

As will appear, both at the outer periphery 10 and at the inner periphery 11 of the gasket 2, the metal strip continues beyond the packing strip and is wound upon itself for several convolutions as shown at 5a and 5b respectively, these terminal convolutions being secured together almost invariably, in practice, by spot welding as indicated at 12.

The corrugation 7 of the metal strip forms, on the outer periphery 10 of the gasket 2, a continuous outwardly projecting bead 13 running entirely around the perimeter of the gasket between two outer peripheral straight wall portions or zones 14, 14 which are substantially parallel to the axis of the gasket.

The conformation of the corrugation 7 produces in the inner periphery 11 of the gasket a groove 15 interposed between two straight portions 16, 16, normally substantially parallel to the axis.

The protecting sheath 3 comprises an inner peripheral reinforcing ring or wall 17 and continuous outwardly extending peripheral flanges 18, 18 integrally formed with the ring. These flanges 18, 18 are turned outwardly upon the top and bottom faces 8 and 9 of the gasket 2 adjacent the periphery 11 thus embracing the inner marginal portion of the gasket adjacent the opening 4. The flanges 18, 18 extend outwardly from the inner periphery only for a part of the distance to the outer periphery and accordingly cover less than one half of the area of the gasket between the peripheries. The application of the sheath 3 to the gasket is effected by means of suitable dies in a press, spinning machine or the like, and the flanges 18, 18 are preferably forced toward the gasket 2 and toward each other until they are pressed into the upper and lower faces of the gasket to such an extent that, in the normal condition of the gasket, the top and bottom faces of the flanges are substantially flush with those portions of the faces 8 and 9 of the gasket outwardly beyond the flanges.

As a result of this pressing of the flanges 18, 18 into the faces of the gasket, those metal strips 5 covered by the flanges are axially compressed thus deflecting and tensioning the corrugations 7 as shown at 7a in Fig. 3.

It is to be noted that the wall 17 snugly contacts the straight portions 16, 16 of the inner periphery of the gasket 2. At the junctions of the wall 17 and the flanges 18, the sheath 3 is formed with radial fillets 19 which, when the sheath is applied to the gasket, force the upper and lower edges of the straight portions 16, 16 of the strips outwardly as indicated at 20, 20.

While many services for a reinforced gasket of this type will occur to those skilled in this art, one application of this gasket is illustrated in Fig. 2, in which the gasket is used to seal a joint between the opposed flat faces of a pair of companion flanges. In this figure two alined pipe sections, assumed to be conveying fluid under pressure, are indicated at 21 and 22. Having threaded connection with the pipe sections 21 and 22 are companion flanges 23 and 24 each formed with a plurality of bolt holes adapted to receive flange bolts 25. These bolts serve as a means for forcing the flanges toward each other. The central portions of the flanges 21 and 22 having complementary male and female conformations form a projecting face 26 and a recessed face 27, respectively, between which the gasket 1 is interposed. Fig. 2 illustrates the gasket in its normal uncompressed condition in engagement with the faces of the flanges but prior to the application of any substantial pressure by the flange bolts 25. In practice the flanges are drawn together into engagement with the integral gasket by successively tightening up the bolts in the flanges until a seal is assured.

As the flanges are advanced toward the reinforced gasket, the surfaces 8 and 9 form intimate pressure sealing contact with the faces of the flanges and a further compression of the gasket by the flanges axially compresses or deflects the corrugations in the metal strips. Due to the fact that the corrugations 7a of the metal strips 5 have been pre-compressed, the resistance to axial compression of the portion of the gasket 1, adjacent the inner periphery, is slightly greater than the resistance to compression of the portion of the gasket outwardly beyond the edges of the flanges 18, 18. For this reason the pressure of the surfaces of the flanges 18, 18 against the faces is of greater intensity than the pressure of the surfaces 8 and 9 against the flange faces.

It is to be noted that the metal of the sheath is thin enough to conform to the irregularities of the flange faces and yet is of sufficient flexibility so that it does not interfere with the inherent resilient functioning of the gasket. It will be understood that the inner peripheral wall 17 of the sheath 3 flexes or bows inwardly slightly as axial pressure is applied and does not therefor impair the inherent resilience of the adjacent metal strips. Gaskets reinforced as herein described have been found to have a greater recovery, after compression, toward their original thickness when the pressure is removed, that is, they have a greater percentage of re-expansion after compression than gaskets not so reinforced.

One of the greatest weaknesses of spiral wound gaskets is its danger of being overcompressed or crushed in service, thereby impairing its effectiveness as a gasket. The reinforcing sheath or shell 3 seems to provide the needed resistance to crushing under varying unit gasket pressures without impairing the desirable easy-to-seal property of the spiralwound type of gasket.

Reference to Fig. 3 clearly indicates that this reinforcing sheath, and particularly the wall 17 and fillets 19, 19 thereof, backs up the upper and lower edges of the inner convolutions 5b of the metal strip to effectively prevent the inward wrinkling, buckling or wedging of the upper and lower edges of these convolutions and the accompanying weakening of the gasket at its inner periphery. The reinforcing sheath 3 therefor, not only entirely prevents or greatly lessens the possibility of strip breakage at the inner periphery but, even if this should occur, insures continued satisfactory functioning of the gasket.

This metal sheath presenting an impervious and unbroken surface over the entire inner periphery and adjacent face portions of the gasket serves as an effective bar to the seepage of the sealed medium thru the gasket and also effectively bars the penetration of the sealed medium into the asbestos convolutions of the gasket and prevents any wicking action by these asbestos convolutions thru the gasket.

The sheath 3 may be made of metal having properties entirely different from the properties of the strip metal of the gasket and each type of metal can be selected to suit the function which it is best adapted to perform. The sheath, for instance, may be made of some relatively corrosion resisting or deterioration resisting metal with respect to the medium which is confined, which metal might not be satisfactory for use as a strip metal, whereas the metal strip may be made of a relatively more resilient metal even tho it might be corroded by the sealed medium.

The use of such a corrosion resisting sheath effectively prevents access of the sealed medium to the inner portion of the gasket and prevents the strip metal from being eaten away, thus preserving the spiralwound gasket and greatly extending the useful life of this gasket as compared with the life of previously known spiralwound gaskets. Whereas, heretofore, it has been necessary to carry in stock gaskets whose metal strips were made of different materials to suit the different types of corrosive action of the fluids with which they were intended to be used, it is possible under this invention, to make all gaskets in production quantities of the same composition of metal and provide them, as required, with reinforcing sheaths having corrosion resisting properties necessary for the service for which the gaskets are intended.

It is to be noted that this improved reinforced gasket has two contiguous successive types of metal surfaces engaging the sealing faces of the flanges, the first surface being the relatively smooth all metal surface formed by the flanges 18 and the second surface consisting of a surface including the edges of strip metal 5 in convolutions with interposed packing material. These two successive types of surfaces adapt the gasket for service with varying types of joint faces some of which will be most effectively sealed by one type of gasket surface and the other of which by the other gasket surface.

This reinforced gasket preserves all of the advantages of the spiralwound type of gasket and the preservation of these advantages for a long period of time is insured by the protection afforded to the spiralwound surface by the protecting sheath against the progressive deteriorating action of the sealed fluid.

This invention lends itself to various modifications, one of which is illustrated in Fig. 4, this modification being directed to a different conformation of the flanges of the sheath. In this figure, in which portions similar to those described above are indicated by identical reference characters, the gasket 2 is substantially identical with that previously described. The sheath 30, illustrated in this figure, consists of an inner peripheral reinforcing ring or wall 31 snugly engaging the inner periphery 11 of the gasket and particularly the outer edges of the straight areas 16, 16 of the inner metal strip convolutions. Integrally formed with the wall 31 are outwardly extending peripheral flanges 32, 32 which are turned upon the top and bottom faces 8 and 9 of the gasket 2 adjacent the periphery 11. These flanges 32 are formed with a plurality of continuous, preferably concentric ridges 33 and grooves 34, the ridges being imbedded in the faces of the gaskets. These ridges are spaced substantially the same distance apart as the convolutions of the strip metal 5 and are preferably imbedded in the packing strip 6, thus radially interlocking the upper and lower edges of the metal strips with the flanges 32 by virtue of the seating of these upper and lower edges of the flanges in the grooves 34. The outer surfaces of the flanges 32, 32 are preferably impressed into the gasket sufficiently so that the upper and lower faces of the flanges 32 are flush with the faces 8 and 9 of the gasket located outwardly beyond the flanges, as a result of which the corrugations 7 in those metal strips 5 embraced by the flanges are pre-compressed as clearly shown at 7a in Fig. 4. This modified form of gasket has all of the advantages inherent in the first described form together with the advantage gained by the effective interlocking of the edges of the metal strip convolutions with the sheath flanges and also by the advantage resulting from the spaced circular narrow bands of contact of the upper and lower surfaces of the sheath flange faces.

Another modification of this improved reinforced gasket is fragmentarily illustrated in Fig. 5, this modification showing a gasket substantially identical with that illustrated in Fig. 3 except in respect to the sheath 35. This sheath is provided with a relatively thicker inner peripheral reinforcing wall 36 snugly engaging the inner periphery 11 of the gasket 2 and being formed with integral flanges 37, 37 of substantially the same thickness as those illustrated in Fig. 3 and turned outwardly upon and impressed in the top and bottom faces 8 and 9 of the gasket 2. This modified form of reinforced gasket is particularly adapted for conditions in which the corrosive action of the sealed fluid is especially severe and the expedient of a thicker reinforcing wall is provided for the purpose of lengthening the useful life of the gasket.

Another modification of this invention is illustrated in Figures 6 and 7 in which the gasket 2 is substantially identical with that hereinbefore described. The inner periphery of this gasket is sheathed by means of a reinforcing sheath indicated at 40 which serves as a combined protective reinforcing sheath and compression limiting gauge. As is well known, separate compression limiting gauges are frequently associated with spiralwound gaskets. Such gauges are usually somewhat thinner than the gaskets, the thickness of the gauge being sufficient to stop the advance of the flange surfaces toward each other at a distance which will prevent an overcompression of the gasket and an accompanying impairing of the sealing effectivness of the gasket. Such gauges have heretofore been entirely separate, usually solid steel elements, loosely connected with and usually disconnectable from the gasket. The modified form of this invention, illustrated in Figures 6 and 7, eliminates the necessity for a separate loose compression limiting gauge and produces certain additional advantages to be pointed out.

The sheath 40 accordingly comprises a peripheral wall or collar structure 41 having an outer periphery 42, an inner periphery 43, an upper surface 44 and a lower surface 45. The outer periphery 42 snugly engages the inner periphery 11 of the gasket 2. The axial thickness of the collar 41 between the surfaces 44 and 45 is considerably less than the thickness of the gasket 2, the extent of this reduced thickness being based upon the extent to which the gasket may be compressed without impairing its efficiency. The radial dimension of the collar or wall 41 between the surfaces 42 and 43 is sufficient to effectively resist the force of the bolts in advancing of the sealing flanges toward each other.

The sheath 40 is further provided with integral flanges 18a turned outwardly upon and compressed into the top and bottom faces of the gasket 2, adjacent the periphery 11, the flanges 18a being of substantially the same thickness as those illustrated in Fig. 3 and being integrally connected with the upper and lower inner edges of the collar 41 by curved fillets 19a also of substantially the same thickness as the flanges in order that they may not impair the axial resilience of the gasket.

Fig. 6 illustrates an installation in which this modified type of reinforced gasket is used. In this figure, alined pipe sections 46 and 47 have threaded connection with companion flanges 48 and 49 each formed with a plurality of bolt holes to receive bolts 52 fragmentarily shown in this view. The central portions of these flanges are provided with male and female conformations provided with seats 50 and 51, respectively, interposed between which is a reinforced gasket provided with a combined sheath and compression limiting gauge of the type just described. As the flanges 48 and 49 are drawn together the gasket is compressed by successively tightening the bolts 52 in the flanges until a seal is assured or until the engagement of the compression limiting gauge by the flange faces is indicated by the solid resistance which prevents a further normal advancing of the flanges.

It will be apparent that advantages of the previously described constructions are all embodied in this modified form of Figures 6 and 7 and this form of sheath additionally stiffens the gasket in a radial direction, provides a relatively large body of metal to protect the gasket proper against corrosion, erosion or other deteriorating action, in addition to serving as a compression limiting gauge for the gasket.

It will be evident that, altho the hereinbefore described gaskets are shown annular in conformation, these gaskets may be made in an oval, elliptical or of any other regular or irregular conformation which may be necessary or convenient to suit the conformation of the surfaces to be sealed.

It is also to be noted that in its broader conception this invention is not limited to a sheath applied to the inner periphery of a gasket and that under certain circumstances the sheath may be applied to the outer periphery, or both peripheries of a gasket.

It will also appear that the serrated type of sheath illustrated in Fig. 4 produces certain novel advantages if used with other types of gaskets in addition to the spiralwound type of gasket with which it is illustrated.

Many other morifications of this invention and its application, in addition to those shown, will naturally occur to those skilled in this art and the present disclosures should therefore be considered as typical only and applicant desires not to be limited to the exact constructions shown and described.

What I claim is:

1. A compressible gasket formed of alternate spirally wound convolutions of packing material and strip metal having a longitudinal median corrugation, said gasket having an outer periphery and an inner periphery defining an opening, and a unitary protecting metallic sheath extending around and engaging one of said peripheries and formed with an intermediate peripheral wall and integral flanges turned radially from said wall upon the top and bottom faces of the gasket adjacent the said one periphery only and pressed into said faces to an extent sufficient to axially compress the corrugated strip metal convolutions interposed between the flanges and to dispose the outer surfaces of said flanges in substantially the plane of the outer surfaces of the remaining portions of the gasket whereby any sealing pressure applied to the gasket compresses the flanges and remaining portions of said surfaces simultaneously.

2. A gasket formed of alternate spirally wound convolutions of packing material and strip metal having a longitudinal median outwardly extending corrugation, said gasket having an outer periphery and an inner periphery defining an opening, said inner periphery being lined by at least one convolution of said strip metal, and a unitary protecting metallic sheath extending around and snugly engaging the inner periphery of the opening, said sheath being formed with an inner peripheral wall and continuous integral flanges turned outwardly from said wall upon the top and bottom faces of the gasket, said flanges covering substantially less than one half of the face area of the gasket between said peripheries, the outer surfaces of said flanges being disposed in substantially the plane of the outer surfaces of the remaining portions of the gasket whereby any sealing pressure applied to the gasket compresses the flanges and remaining portions of said surfaces simultaneously.

3. A gasket comprising a flat relatively compressible portion formed of alternate spirally wound convolutions of packing material and strip metal having an opening defined by a peripheral wall and a unitary protective sheath extending around the peripheral wall of the opening, said sheath having a peripheral wall substantially parallel to and in substantial engagement with the peripheral wall of the opening and having flat flanged portions integrally formed with the wall of the sheath and turned upon the top and bottom faces of the compressible portion surrounding the opening, said flanges extending less than half way to the outer edges of the gasket and the exterior surfaces of the flanges being disposed in substantially the plane of the outer surfaces of the remaining portions of the gasket whereby any sealing pressure applied to the gasket compresses the flanges and remaining portions of said surfaces simultaneously.

4. A gasket formed of alternate spirally wound convolutions of strip metal and packing material having an opening, and a unitary protective sheath extending around the periphery of the opening said sheath having a peripheral wall engaging the periphery of the opening, and integral flange portions turned outwardly upon the top and bottom faces of the gasket, said flange portions extending less than half way to the outer edge of the gasket and being formed on their gasket engaging faces with a plurality of continuous ridges substantially parallel to the convolutions of strip metal and imbedded in the gasket faces so that the outermost points on the ridges are disposed in substantially the plane of the outer surfaces of the remaining portions of the gasket whereby any sealing pressure applied to the gasket compresses the flanges and remaining portions of said surfaces simultaneously.

5. An annular gasket formed of spirally wound alternate convolutions of packing material and strip metal having a longitudinal median outwardly extending corrugation, and a protective metallic sheath formed with a wall engaging the inner periphery of the gasket and formed with integral flanges turned outwardly upon the top and bottom faces of the gasket adjacently surrounding the opening, the said wall being integrally formed with an inwardly extending substantially median collar of substantially greater thickness in a radial direction than the thickness of the flange portions of the sheath and of less thickness in an axial direction than the gasket, said collar being adapted to serve as a gauge for limiting the compression of the gasket.

6. A gasket formed of spirally wound alternate convolutions of packing material and strip metal having an outwardly extending corrugation and a protective metallic sheath formed with a wall engaging the inner periphery of an opening in the gasket and formed with integral flanges turned outwardly upon the top and bottom faces of the gasket adjacently surrounding the opening, said wall being integrally formed with an inwardly extending collar of substantially greater thickness in a radial direction than the thickness of the flange portions of the sheath and of less thickness in an axial direction than the gasket, said collar being adapted to bear against a part to be sealed by the gasket to cooperate therewith in determining the relative positions of said part and the gasket.

FREDERICK W. GOETZE.